(No Model.)

A. B. HENDRYX.
FISHING REEL.

No. 478,327. Patented July 5, 1892.

Witnesses
J. H. Shumway
Fred. W. Peck

Andrew B. Hendryx
Inventor
By atty
Earle Seymour

UNITED STATES PATENT OFFICE.

ANDREW B. HENDRYX, OF NEW HAVEN, CONNECTICUT.

FISHING-REEL.

SPECIFICATION forming part of Letters Patent No. 478,327, dated July 5, 1892.

Application filed May 31, 1892. Serial No. 434,835. (No model.)

*To all whom it may concern:*

Be it known that I, ANDREW B. HENDRYX, of New Haven, in the county of New Haven and State of Connecticut, have invented a new Improvement in Fishing-Reels; and I do hereby declare the following, when taken in connection with accompanying drawings and the letters of reference marked thereon, to be a full, clear, and exact description of the same, and which said drawings constitute part of this specification, and represent, in—

Figure 1:
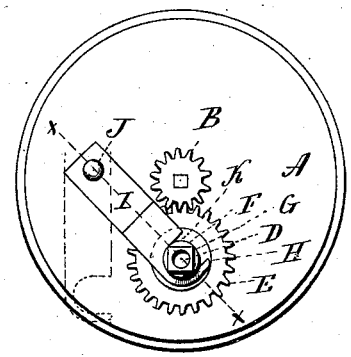
Figure 2:
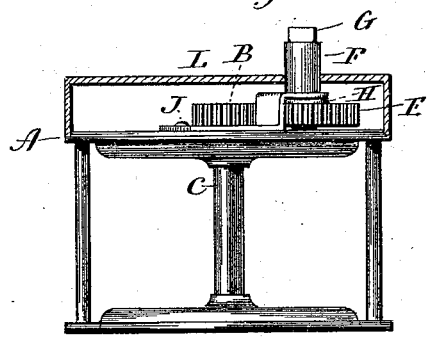
Figure 4:
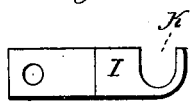
Figure 3:
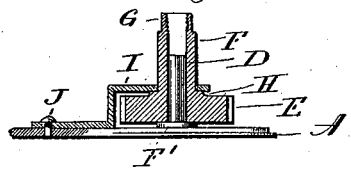

Figure 1, a side view of the head on which the mechanism for operating the spool is arranged, with the cap removed; Fig. 2, a side view of the reel, showing the cap in central section; Fig. 3, a longitudinal section cutting on line $x\ x$ of Fig. 1, and Fig. 4 the guard detached.

This invention relates to an improvement in that class of fishing-reels in which a multiplying-gear is introduced between the crank and spool shaft.

In the usual construction the gear-wheel of the crank is arranged longitudinally loose within the chamber of the head, depending upon the two sides of the chamber for its support in an axial direction. The result of this freedom of the wheel is that there is unavoidably so much play longitudinally to the wheel that the rapid working of the crank, as by the running of the line, will produce an undesirable rattling and the operation in turning the crank is of a disagreeable shackly character. Again, the cap or outer surface of the head is liable to indentation, and as it is necessary that the wheel shall run in as close contact as conveniently may be with that surface it frequently occurs that the indentation or bending of the outer part of the head will press upon the wheel and interfere with the proper working.

The object of this invention is to support the wheel entirely from the inner head and independent of the cap or outer portion of the head; and it consists in the construction as hereinafter described, and particularly recited in the claim.

A represents the head of the reel on that side on which the crank is placed.

B represents the center pinion, which is on the shaft of the spool C, the spool being arranged between the two heads of the reel in the usual manner.

D represents the spindle of the multiplying-wheel, which is made stationary upon the head at one side of the spool-shaft and distant therefrom according to the diameter required for the multiplying-wheel with relation to the pinion B, the axis of the spindle D being parallel with the axis of the spool-shaft.

E represents the multiplying-wheel, the teeth of which correspond to the teeth of the pinion and so as to work therein, as shown, or may be intermediate or other multiplying-wheels, if desired. The wheel E is constructed with a tubular hub F, which extends outward and terminates at its outer end in a form about which the crank may be readily coiled, (here represented as of annular shape, as at G.) The multiplying-wheel is set on over the spindle D, the hub F serving to give a sufficient support upon the spindle, that the wheel may not cramp. The wheel is constructed on its outer side with a central boss H. The wheel and its spindle may be set onto or removed from the spindle as occasion requires; but to support the wheel when on the spindle a guard I is made from sheet metal, attached to the head upon a pivot J at one side of the wheel E, and bent upward and over the wheel. At its free end the guard I has a notch K, formed on one side, as seen in Fig. 5. This notch is of semicircular or segment shape, corresponding to the diameter of the hub F, and so that when the wheel is set in place the guard may be turned over the wheel, the notch K embracing the hub F, and so that the guard will rest on the boss H of the wheel or sufficiently close thereto to support the wheel between the guard and the shoulder F' to prevent longitudinal movement of the wheel. As the guard I is free to turn upon its pivot J, whenever it is desirable to remove the wheel E it is only necessary to turn the guard to one side, as represented in broken lines, Fig. 1, and then when the wheel is replaced the guard is returned to support the wheel. By this construction the wheel is supported upon the head A entirely independent of the cap L, which incloses the multiplying mechanism, and so independent of that cap that should the cap become indented, as will frequently be the case, such indentation would have no effect upon the operation of the multiplying-wheel.

I claim—

1. In a fishing-reel, substantially such as described, the spindle D, fixed on the head at one side of the spool-shaft, the multiplying gear-wheel E, arranged on said spindle and adapted to engage with a corresponding pinion on the spool-shaft, the wheel E, constructed with a tubular hub F and constructed for the attachment of the crank upon its outer end, combined with the guard I, pivoted to the head and extending over the wheel, constructed with a notch in one side near its end to adapt that end to surround the hub outside the wheel, substantially as described, and whereby the wheel is supported longitudinally between the said guard and head of the reel.

In testimony whereof I have signed this specification in the presence of two subscribing witnesses.

ANDREW B. HENDRYX.

Witnesses:
FRED. C. EARLE,
GEORGE D. SEYMOUR.